United States Patent
Forstall et al.

(10) Patent No.: US 8,688,070 B2
(45) Date of Patent: *Apr. 1, 2014

(54) LOCATION-BASED EMERGENCY INFORMATION

(75) Inventors: Scott Forstall, Mountain View, CA (US); Gregory N. Christie, San Jose, CA (US); Robert E. Borchers, Pleasanton, CA (US); Imran A. Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,704

(22) Filed: Sep. 11, 2012

(65) Prior Publication Data

US 2013/0012155 A1   Jan. 10, 2013

Related U.S. Application Data

(63) Continuation of application No. 11/969,152, filed on Jan. 3, 2008, now Pat. No. 8,275,352.

(60) Provisional application No. 60/946,942, filed on Jun. 28, 2007.

(51) Int. Cl.
    *H04M 11/04*   (2006.01)

(52) U.S. Cl.
    USPC ............... 455/404.2; 455/456.3; 455/466; 455/414.3

(58) Field of Classification Search
    USPC ............... 455/404.1, 404.2, 456.1–457, 466, 455/412.1, 414.1–414.4; 379/45
    See application file for complete search history.

(56) References Cited

U.S. PATENT DOCUMENTS

| | | | | |
|---|---|---|---|---|
| 7,466,235 B1 * | 12/2008 | Kolb et al. | ................. | 340/573.1 |
| 7,962,119 B2 * | 6/2011 | Kuz et al. | ................. | 455/404.1 |
| 8,036,634 B2 * | 10/2011 | DiMeo et al. | ............. | 455/404.1 |
| 8,385,879 B2 * | 2/2013 | Thomas | ..................... | 455/404.1 |
| 8,509,732 B1 * | 8/2013 | Venkatraman | ............. | 455/404.2 |
| 2004/0203622 A1 * | 10/2004 | Esque et al. | ................ | 455/412.1 |
| 2007/0087726 A1 * | 4/2007 | McGary et al. | ............ | 455/404.1 |
| 2008/0096518 A1 * | 4/2008 | Mock et al. | ................ | 455/404.1 |
| 2010/0190467 A1 * | 7/2010 | Scott et al. | ................ | 455/404.2 |
| 2010/0240337 A1 * | 9/2010 | DiMeo et al. | ............. | 455/404.1 |
| 2010/0267357 A1 * | 10/2010 | Holmstrom et al. | ....... | 455/404.1 |
| 2011/0230159 A1 * | 9/2011 | Hatton | ....................... | 455/404.1 |

* cited by examiner

*Primary Examiner* — Sharad Rampuria
(74) *Attorney, Agent, or Firm* — Fish & Richardson P.C.

(57) ABSTRACT

Methods, systems, and apparatus, including computer program products, for location-based emergency information. A current geographic location of a device is determined. One or more first contact information items based on the determined geographic location are received at the device. The first contact information items include one or more contact information items associated with emergency services.

21 Claims, 6 Drawing Sheets

| | Name | Address | Telephone Number(s) | Image (Optional) | Email | Special | ICE |
|---|---|---|---|---|---|---|---|
| 502-A | Emergency – Country A | Country A | 112 | CountryA_Flag | | Ser | Not Set |
| 502-B | US Consulate at City X, Country A | 123 Main St., City X 12345, Country A | (7)12345678 | US_Flag | | Set | Not Set |
| 502-C | John Smith | 456 Main Ave., City Y, CA 56789, USA | (123) 456-7890 | john_photo | jsmith@bb.net | Not set | Set |
| | ... | ... | ... | ... | ... | ... | ... |
| 502 | Individual N | Address N | Telephone Number N | Photograph N | Email N | Not set | Not set |

FIG. 5

US 8,688,070 B2

LOCATION-BASED EMERGENCY INFORMATION

RELATED APPLICATIONS

This application is a continuation of U.S. patent application Ser. No. 11/969,152, filed Jan. 3, 2008, which claims priority benefit of U.S. Provisional Application No. 60/946,942, filed Jun. 28, 2007, all of which are incorporated by reference herein their entirety.

BACKGROUND

This specification relates generally to mobile devices.

When a person travels abroad, emergencies can occur. For example, the person can become injured in an accident, be a victim of a crime, or lose their travel documents. In such situations, having knowledge of contact information for local emergency services or the pertinent consular services can be beneficial.

A person may gather emergency services and consular services information before traveling. However, the process of gathering the information can be time-consuming, especially if the person's itinerary includes stops in multiple countries. Given the many preparations a person often makes before traveling abroad, a person may neglect to gather the information entirely. A person may try to rely on local individuals or a phonebook for emergency services or consular services information while abroad, but such assistance may not be readily available when an emergency does occur.

SUMMARY

In general, one aspect of the subject matter described in this specification can be embodied in methods that include the actions of determining a current geographic location of a device, and receiving one or more first contact information items based on the determined geographic location, where the first contact information items include one or more contact information items associated with emergency services. Other embodiments of this aspect include corresponding systems, apparatus, devices, and computer program products.

In general, another aspect of the subject matter described in this specification can be embodied in methods that include, at a device operable as a phone, the actions of receiving user input dialing an emergency phone number; determining a geographic location at which the device is located; determining whether the dialed emergency phone number is proper for the determined geographic location; retrieving a replacement emergency phone number based on the determined geographic location, if the dialed emergency phone number is determined to be improper for the determined geographic location; and dialing the replacement emergency phone number. Other embodiments of this aspect include corresponding systems, apparatus, computer program products, and computer readable media.

Particular embodiments of the subject matter described in this specification can be implemented to realize one or more of the following advantages. A device can receive and update location-based contact information (e.g., emergency phone numbers, consular services) automatically. A traveler is spared from the task of researching emergency phone numbers for destination countries before traveling. A traveler can have the correct emergency phone numbers readily available when an emergency occurs.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 is a block diagram illustrating an example data structure for address book data.

Like reference numbers and designations in the various drawings indicate like elements.

DETAILED DESCRIPTION

Figure 1:
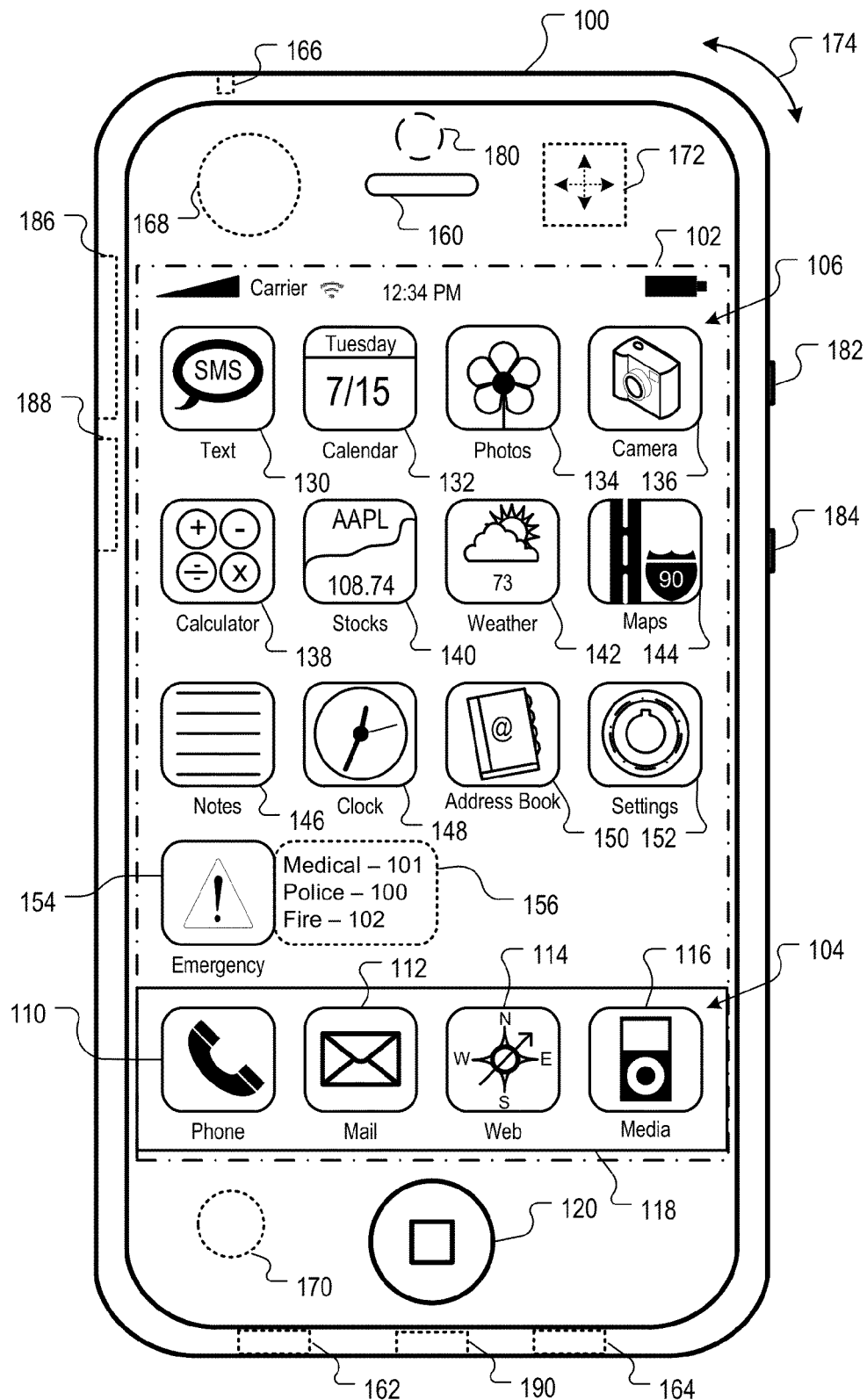
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or other electronic device or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. An example of a multi-touch-sensitive display technology is described in U.S. Pat. Nos. 6,323,846; 6,570,557; 6,677,932; and U.S. Patent Publication No. 2002/0015024A1, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. Each of the display objects 104, 106 can be a graphic representation of a system object. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular device objects 104, e.g., the phone object 110, the e-mail object 112, the Web object 114, and the media player object 116, can be displayed in a menu bar 118. In some implementations, each of the device functionalities can be accessed from a top-level graphical user interface, such as the graphical user interface illustrated in FIG. 1. Touching one of the objects 110, 112, 114 or 116 can, for example, invoke the corresponding functionality.

In some implementations, the mobile device 100 can implement network distribution functionality. For example, the functionality can enable the user to take the mobile device 100 and its associated network while traveling. In particular, the mobile device 100 can extend Internet access (e.g., via Wi-Fi) to other wireless devices in the vicinity. For example, mobile device 100 can be configured as a base station for one or more devices. As such, mobile device 100 can grant or deny network access to other wireless devices.

In some implementations, upon invocation of particular device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, a settings object 152, and an emergency dialing object 154. Touching the SMS display object 130 can, for example, invoke an SMS messaging environment and supporting functionality. Touching the emergency dialing object 154 can, for example, invoke automatic dialing of an emergency phone number or an emergency dialing environment and supporting functionality. Likewise, each selection of a display object 132, 134, 136, 138, 140, 142, 144, 146, 148, 150 and 152 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning system (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi), code division multiple access (CDMA), global system for mobile communications (GSM), Enhanced Data GSM Environment (EDGE), 3G (e.g., EV-DO, UMTS, HSDPA), etc.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, a personal computer, a printer, or other processing devices capable of receiving and/or transmitting data. In some implementations, the port device 190 allows the mobile device 100 to synchronize with a host device using one or more protocols.

Network Operating Environment

Figure 2:
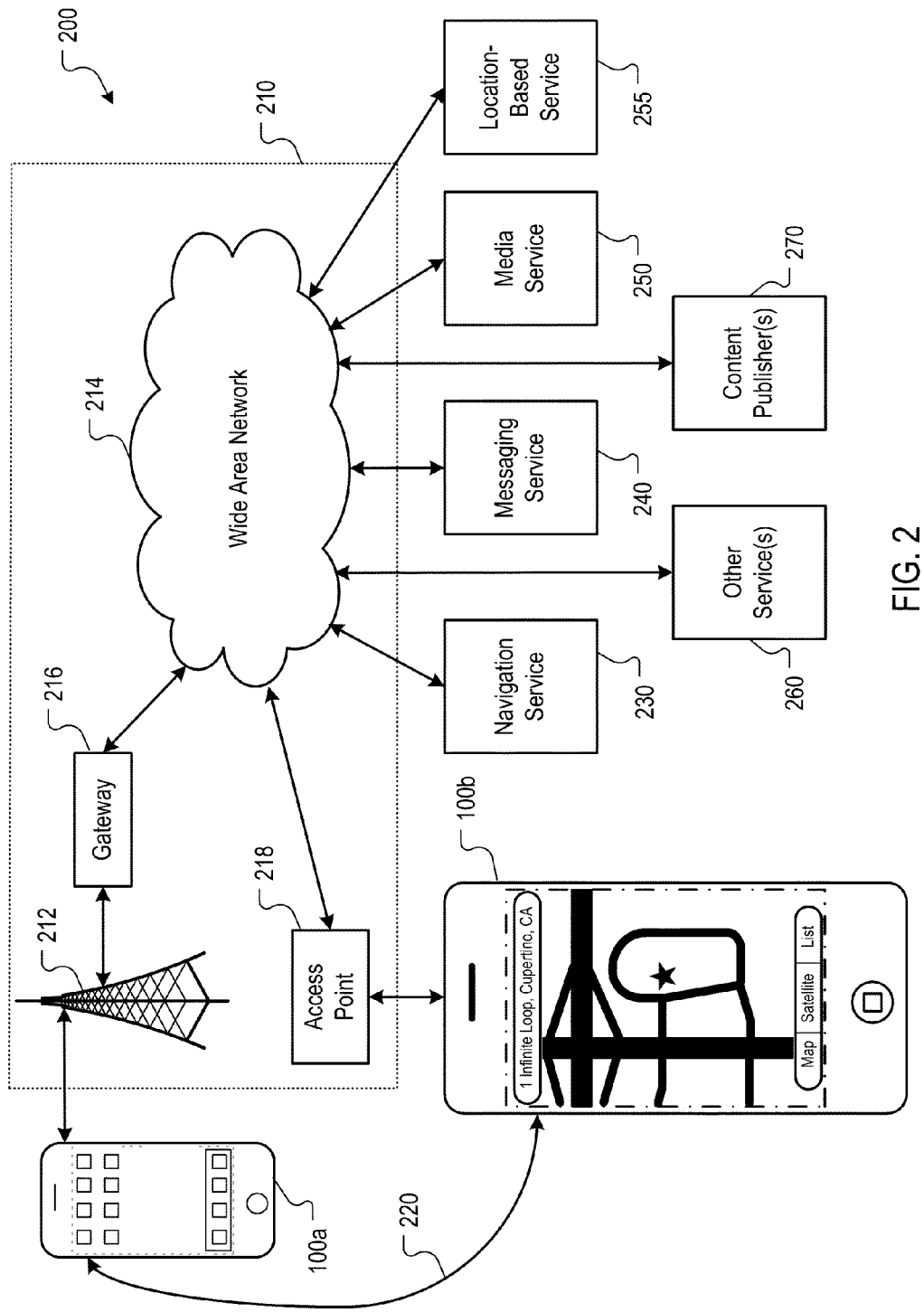
FIG. 2 is a block diagram of an example network operating environment for the mobile device of FIG. 1.

FIG. 2 is a block diagram of an example network operating environment 200 for the mobile device 100 of FIG. 1. The mobile device 100 of FIG. 1 can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access point 218, such as an 802.11g wireless access point, can provide communication access to the wide area network 214. In some implementations, both voice and data communications can be established over the wireless network 212 and the access point 218. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, the mobile device 100b can place and receive phone calls, send and receive e-mail messages, and retrieve electronic documents over the access point 218 and the wide area network 214. In some implementations, the mobile device 100 can be physically connected to the access point 218 using one or more cables and the access point 218 can be a personal computer. In this configuration, the mobile device 100 can be referred to as a "tethered" device.

The mobile devices 100a and 100b can also establish communications by other means. For example, the wireless device 100a can communicate with other wireless devices, e.g., other wireless devices 100, cell phones, etc., over the wireless network 212. Likewise, the mobile devices 100a and 100b can establish peer-to-peer communications 220, e.g., a personal area network, by use of one or more communication subsystems, such as the Bluetooth™ communication device 188 shown in FIG. 1. Other communication protocols and topologies can also be implemented.

The mobile device 100 can, for example, communicate with one or more services 230, 240, 250, 255, and 260 and/or one or more content publishes 270 over the one or more wired and/or wireless networks 210. For example, a navigation service 230 can provide navigation information, e.g., map information, location information, route information, and other information, to the mobile device 100. In the example shown, a user of the mobile device 100b has invoked a map functionality, e.g., by pressing the maps object 144 on the top-level graphical user interface shown in FIG. 1, and has requested and received a map for the location "1 Infinite Loop, Cupertino, Calif."

A messaging service 240 can, for example, provide e-mail and/or other messaging services. A media service 250 can, for example, provide access to media files, such as song files, movie files, video clips, and other media data. A location-based service 255 can, for example, provide data or content based on a current location of the mobile device 100. One or more other services 260 can also be utilized by the mobile device 100, including a syncing service, an activation service and a software update service that automatically determines whether software updates are available for software on the mobile device 100, then downloads the software updates to the mobile device 100 where the updates can be manually or automatically unpacked and/or installed.

The mobile device 100 can also access other data over the one or more wired and/or wireless networks 210. For example, content publishers 270, such as news sites, RSS feeds, web sites, blogs, social networking sites, developer networks, etc., can be accessed by the mobile device 100. Such access can be provided by invocation of a web browsing function or application (e.g., a browser) in response to a user touching the Web object 114.

Example Device Architecture

Figure 3:
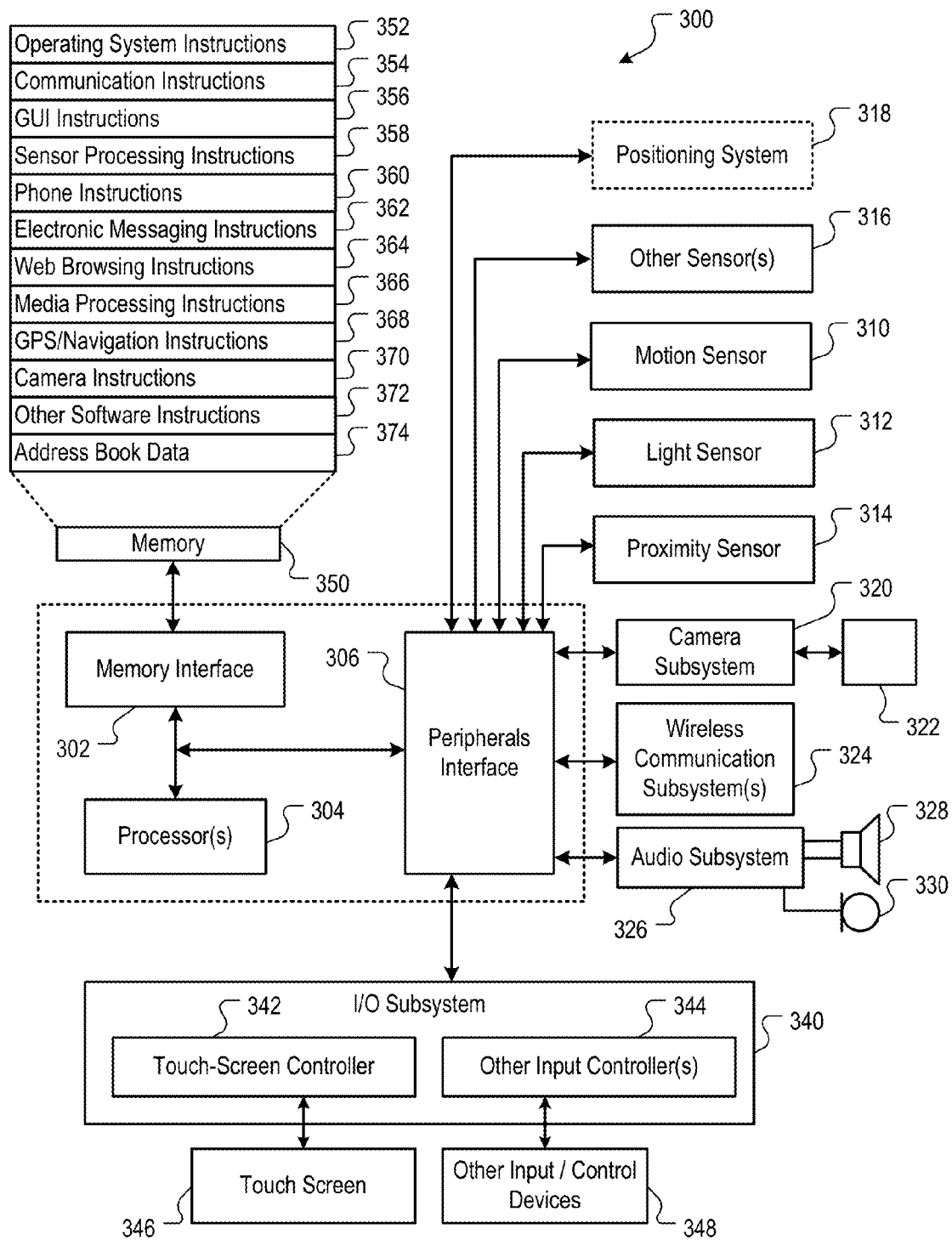
FIG. 3 is a block diagram of an example implementation of the mobile device of FIG. 1.

FIG. 3 is a block diagram 300 of an example implementation of the mobile device 100 of FIG. 1. The mobile device 100 can include a memory interface 302 one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting and proximity functions described with respect to FIG. 1. Other sensors 316 can also be connected to the peripherals interface 306, such as a GPS receiver, a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 is intended to operate. For example, a mobile device 100 may include communication subsystems 324 designed to operate over a GSM network, a GPRS network, an EDGE network, a 3G network, a Wi-Fi or WiMax network, and a Bluetooth™ network. In particular, the wireless communication subsystems 324 may include hosting protocols such that the device 100 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 on or off. The user may be able to customize a functionality of one or more of the buttons. The touch screen 346 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other related processes and functions.

The memory 350 can also store data, including but not limited to documents, images, video files, audio files, and other data. In some implementations, the memory 350 stores address book data 374, which can include contact information (e.g., address, phone number, etc.) for one or more persons, organizations, services, or entities.

In some implementations, the mobile device 100 includes a positioning system 318. In various implementations, the positioning system 318 can be provided by a separate device coupled to the mobile device 100, or can be provided internal to the mobile device. In some implementations, the positioning system 318 can employ positioning technology including a GPS, a cellular grid, URIs or any other technology for determining the geographic location of a device. In some implementations, the positioning system 318 can employ a service provided by a positioning service such as, for example, SkyHook Wireless of Boston, Mass., or Rosum Corporation of Mountain View, Calif. In other implementations, the positioning system 318 can be provided by an accelerometer and a compass using dead reckoning techniques. In such implementations, the user can occasionally reset the positioning system by marking the mobile device's presence at a known location (e.g., a landmark or intersection). In still other implementations, the user can enter a set of position coordinates (e.g., latitude, longitude) for the mobile device. For example, the position coordinates can be typed into the phone (e.g., using a virtual keyboard) or selected by touching a point on a map. Position coordinates can also be acquired from another device (e.g., a car navigation system) by syncing or linking with the other device. In other implementations, the positioning system 318 can be provided by using wireless signal strength and one or more locations of known wireless signal sources to provide the current location. Wireless signal sources can include access points and/or cellular towers. Other techniques to determine a current location of the mobile device 100 can be used and other configurations of the positioning system 318 are possible.

Each of the above identified instructions and applications can correspond to a set of instructions for performing one or more functions described above. These instructions need not be implemented as separate software programs, procedures or modules. The memory 350 can include additional instructions or fewer instructions. Furthermore, various functions of the mobile device 100 may be implemented in hardware and/or in software, including in one or more signal processing and/or application specific integrated circuits.

Figure 4:
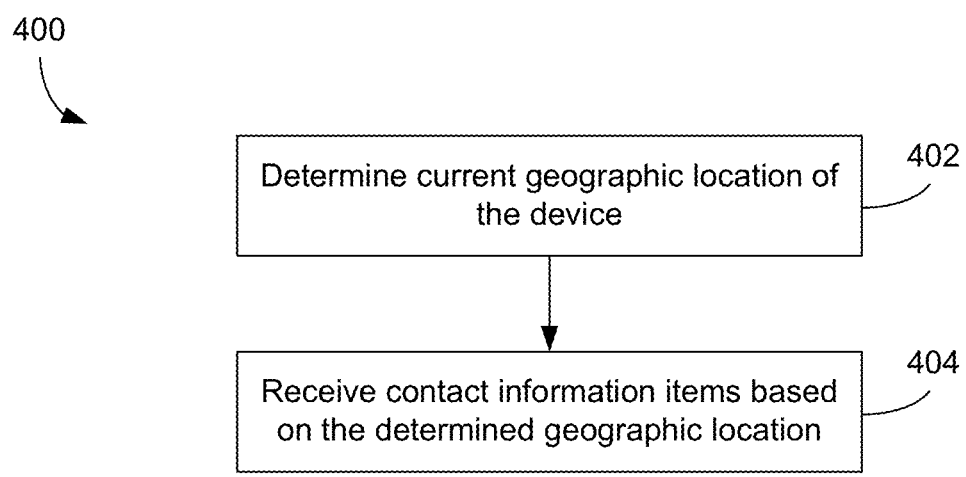
FIG. 4 is a flow diagram illustrating a process for receiving location-based contact information.

FIG. 4 illustrates a process 400 for receiving location-based contact information. For convenience, the process 400 will be described in reference to a device (e.g., device 100) that performs the process 400.

In some implementations, the process 400 begins when a current geographic location of the device is determined (402). The device 100 obtains its current geographic position. In some implementations, the device 100 determines its current location using GPS or any other positioning system. In some implementations, the current location, as determined using GPS, can be expressed in latitude/longitude. In some implementations, the device 100 can, optionally, convert the latitude/longitude of the current location to an address (e.g., country, city) by referencing a database of latitudes/longitudes and locations that is stored in the memory 350.

In some other implementations, the device 100 can obtain its geographic position using other methods. For example, a device 100 can obtain its position using cellular phone tower triangulation, Wi-Fi positioning, a combination of GPS and other signals, differential GPS, identification of location using the Internet Protocol (IP) address, and any other suitable technologies and techniques.

After the location is obtained, one or more items of contact information are received based on the determined geographic location (404). The items can include an address and/or phone number and an indication of the person, organization, service, or entity with which the address/phone number are associated. In some implementations, the device 100 receives contact information items from a location-based service 255. The device 100 sends its determined geographic location to the location-based service 255. For devices using GPS receivers, the device 100 can send a latitude/longitude or an address (e.g., city and country) to the location-based service 255. In an example implementation, device 100 sends the determined location information by sending a request to retrieve information at a Universal Resource Locator (URL) associated with the location-based service 255, with the latitude/longitude or the address as a parameter in the request. In another example implementation, the device 100 sends the determined location by sending a text of the latitude/longitude or the address (e.g., in a SMS message) to the location-based service.

The location-based service 255 receives the determined geographic location from the device 100. If the device 100 sent a latitude/longitude, the location-based service 255 can convert the latitude/longitude to an address. The location-based service 255 identifies (e.g., in its database) one or more items of contact information associated with the location indicated by the latitude/longitude or address, and transmits the identified items to the device 100. In some implementations, the device 100 stores the items in memory 350 (e.g., in address book data 374).

In some implementations, the contact information items include phone numbers for emergency services (or "emergency phone numbers"). The location-based service 255 can include data regarding emergency phone numbers for locations around the world. It is well known that different countries can have different phone numbers for contacting emergency services. For example, the emergency phone number is "911" in the United States, "112" in the European Union, "999" or "112" in the United Kingdom, and so forth. Further, some countries have different phone numbers for different emergency services (e.g., in Israel, the emergency phone number is "100" for the police, "101" for medical emergencies, and "102" for fire emergencies), while other countries have a unified phone number for multiple emergency services (e.g., "911" in the United States for police, medical emergencies, and fire emergencies). When the location-based service 255 receives location information from the device, the location-based service 255 identifies one or more emergency phone numbers based on the received location information. For example, if the location information (e.g., latitude/longitude, city and country) sent by the device 100 indicates the United States, the location-based service 255 identifies the "911" emergency phone number and sends it to the device 100. If the device is relocated to Israel (e.g., the user of the device flies to Israel and carries the device with them) and the location information (e.g., latitude/longitude, city and country) sent by the device 100 indicates Israel, the location-based service 255 identifies the "100," "101," and "102" emergency phone numbers and sends them to the device 100.

In some implementations, the contact information items include contact information for an embassy or consulate providing consular services. The device 100 can include a user interface where a user of the device can specify a "home country" of the device in a pull-down selection menu object, for example. For example, if the use of the device lives in France and uses the device primarily in France, the user can specify "France" as the home country of the device. The home country of the device 100 can be included in the request to the location-based service 255 as an additional parameter. The location-based service 255 can identify the contact information of an embassy or consulate, of the home country of the device, that is nearest to the location of the device. The location-based service 255 transmits the embassy/consulate contact information to the device 100. In some implementations, the home country of the device can be derived from user information stored at any of the services 230, 240, 250, 255, or 260. For example, the user of the device can have a user account with (and stored at) the media service 250. The user account includes user information, such as the user's country. The device 100 can set the home country to be the user's country from the user account.

Thus, for example, if the home country of a device 100 is set to "France," and the device is determined to be located in San Jose, Calif., the location-based service 255 can send the contact information for the French consulate in San Francisco, Calif., which is the French consulate that is nearest to the location (San Jose, Calif.) of the device. If the same device is relocated to Minneapolis, Minn. (e.g., because the user of the device carried the device to Minneapolis, Minn. while traveling), the location-based service 255 can send the contact information for the French consulate in Chicago, Ill., which is the French consulate that is nearest to the new location (Minneapolis, Minn.) of the device.

In some implementations, the contact information items include other types of location-based contact information. For example, the contact information can include contact information for governmental services for the determined geographic location (e.g., non-emergency police services or other law enforcement agencies, poison control, animal control, hazardous material cleanup, weather services, park rangers, etc.), contact information for public utilities (e.g., gas, electricity, water, garbage, telephony, etc.), and so forth.

In some implementations, if the home country of the device 100 matches the current location of the device (e.g., the home country is the U.S. and the device is determined to be located in the U.S.), then whatever consular information that was previously received from a location-based service 255 can be removed from the device 100 and the location-based service can omit contact information for consular services from the contact information items transmitted to the device 100.

It should be appreciated that the examples of location-based contact information items described above (emergency phone numbers, consular services) are merely exemplary. Other types of contact information can be included.

In some implementations, the device 100 is operable to download emergency contact information from a specific network location. For example, an enterprise can store emergency contact information for its employees at a network location. The device 100 can be configured to download the emergency contact information from the network location according to a schedule or by manual intervention.

In some implementations, the emergency information includes default emergency information and override emergency information for particular locations (e.g., the campus or complex of a university, company, or government entity). For example, the default emergency number for the United States is 911, but the emergency information can include a number for campus security at a university campus, and if the device 100 is located at the university campus, the campus security number overrides the default and is dialed instead of the default or the user can choose which one to dial.

In some implementations, the device 100 stores the received contact information items in address book data 374. FIG. 5 illustrates an example data structure 500 for address book data 374. The data structure 500 includes a one or more item entries 502. In some implementations, each item entry 502 includes an item name or identifier 504, one or more addresses 506, one or more telephone numbers 508, one or more optional images or photographs 510, one or more email addresses 512, and/or one or more fields with miscellaneous information about the item. The data structure 500 can store contact information items received from the location-based service 255. For example, entry 502-A includes the emergency phone number for Country A, and entry 502-B includes the address and phone number for the Unites States consulate at City X in Country A. The user can view the received contact information by accessing an address book application on the device 100.

In some implementations, the entries for storing the contact information items received from the location-based service 255 can be edited, manipulated, and deleted by a user of the device 100, as with other entries in the data structure 500. In some other implementations, the entries for storing the contact information items received from the location-based service 255 are special or system entries within the data structure 500; the user of the device 100 cannot edit or delete them. In some implementations, the data structure 500 includes an additional field (e.g., a "special" field 514 in which a flag is set or not set, with a set flag being an indication that the entry is special) for indicating whether an entry is a special entry or not.

In some implementations, the user can also designate one or more entries in the data structure as the designated contact information to use in case of emergency ("ICE"). For example, a user can store the contact information for their spouse in the data structure and designate the spouse as the contact person in case of an emergency by designating the spouse's entry as the ICE contact information. The data structure 500 can include an ICE field 516 with a flag that is set or not set, with a set flag indicating that the entry is an ICE entry. For example, the ICE flag 516 for entry 502-C is set; "John Smith" is designated as the ICE contact. The data structure 500 can have zero, one, or more entries designated as ICE contacts.

In some implementations, when the user dials an emergency phone number from the device 100 (by selecting an emergency dialing object 154, as described below, or by manually entering the digits of an emergency phone number, for example), the device 100 can automatically contact the designated ICE contact as well. The device 100 can automatically send an email message to the ICE contact, dial the phone number of the ICE contact, or send a SMS message to the ICE contact, for example. In some implementations, the user can pre-compose a voice or text message and store the message in the device 100. When the device 100 attempts to contact the ICE contact automatically, the device 100 can forward the pre-composed message to the ICE contact (e.g., playing back a pre-composed voice message while calling the ICE contact, sending the ICE contact a pre-composed message in an email or a SMS message).

In some implementations, if there are multiple ICE contacts in the data structure, there can be a hierarchy or some other order for contacting the ICE contacts. For example, the ICE contacts can be contacted in alphabetical order by last name.

In some implementations, when the location of the device 100 has changed and the contact information items for the new location are different than that for the former location, the data structure 500 is updated to include entries with contact information for the new location. For example, the device 100 can delete the entries with contact information for the former location from the data structure 500 and insert entries for contact information for the new location into the data structure 500. As another example the device 100 can, edit the entries that included the contact information for the former location to include instead the contact information for the new location. In some other implementations, the entries for the former location can be hidden from display (but remain stored in the data structure) and/or cached rather than deleted. When the device 100 re-enters the former location and network connectivity is unavailable, the device 100 can displayed the hidden or cached entries for the former location.

In some implementations, the device 100 can, during a scheduled update of the emergency information, download emergency information for multiple countries. The information for countries in which the device is not currently located is hidden from display. When the device 100 becomes located in another country for which the information had been downloaded, that information can displayed. This can be used to ensure that information is available despite loss of network connectivity.

Figure 6:
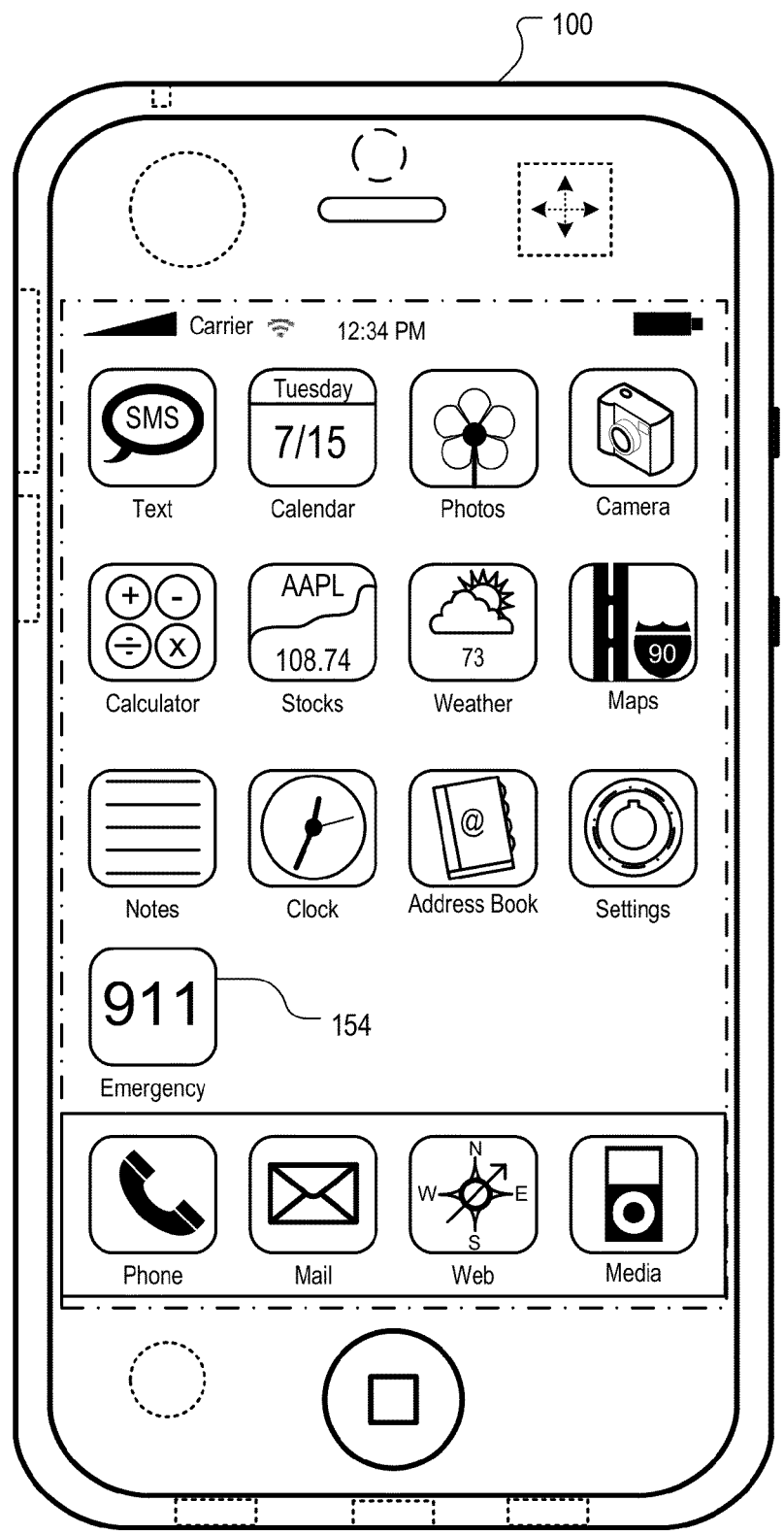
FIG. 6 is a diagram of an example mobile device displaying an emergency dialing object.

In some implementations, if the received contact information items include one or more emergency phone numbers, the emergency phone number(s) can be associated with one or more display objects 104 or 106. For example, if the device 100 is located in the United States and the received contact information includes the unified emergency phone number "911," the phone number "911" can be associated with a display object (e.g., emergency dialing object 154), which can be displayed in the top-level user interface, in a dialing keypad user interface, and other user interfaces of the device 100. When the user selects the display object associated with the emergency phone number, the device 100 automatically initiates dialing of the phone number "911." In some implementations, the emergency dialing object 154 can show the emergency number associated with the object 154 (e.g., "911" while the device is located in the United States), as shown in FIG. 6. In an example implementation, the emergency dialing object 154 first displays an icon (as shown in as shown in FIG. 1), then displays the phone number associated with the object 154 (as shown in FIG. 6). The object 154 can go back and forth between displaying the icon and displaying the emergency phone number.

If the contact information includes multiple emergency phone numbers, one for each of a plurality of services, the device 100 associates the multiple emergency phone numbers with one or more display objects 104 or 106. In some implementations, a separate display object 104 or 106 is associated with each of the emergency phone numbers. For example, if the device 100 is located in Israel and the received contact information includes "100" for the police, "101" for medical emergencies, and "102" for fire emergencies, each of these phone numbers is associated with a separate display object, and selection of any of these display objects initiates automatic dialing of the associated emergency phone number.

In some other implementations, the multiple emergency phone numbers are associated with one display object (e.g., emergency dialing object 154). When the user of the device 100 selects the display object, a menu or additional display objects (e.g., a drawer object 156 that slides out from the emergency dialing object 154, FIG. 1), indicating the multiple emergency phone numbers and/or the corresponding emergency service, is displayed when the user selects the emergency dialing object 154. The user can select one of the multiple emergency phone numbers/services from the menu to initiate dialing of the corresponding emergency phone number. The object 154 can be displayed in the top-level user interface, the dialing keypad user interface, or other interfaces of the device 100.

Other ways of dialing a phone number associated with any of the received contact information items are possible. For example, the user can access the address book (e.g., by selecting the address book object 150), finding the phone number in the address book, and selecting the phone number in the address book to initiate dialing.

The display object(s) associated with the emergency phone number(s) can be displayed on any of the user interfaces of the device 100, including but not limited to a top-level user interface and a phone dialing or phone call management interface.

In some implementations, to maintain the freshness of the location-based contact information items (e.g., the emergency phone number, etc.) stored in the device 100, the device 100 can perform the process 400 whenever particular events occur. In some implementations, the device 100 performs the process 400 when the radio frequency transmitter/receiver of the device 100 is activated. For example, the transmitter can be activated when the device 100 is powered on or when the device 100 goes from flight mode to normal operation. In some implementations, the process 400 is performed upon manual intervention by the user and/or periodically according to a schedule. For example, the device 100 can include a user-selectable command to force an update of the contact information items received from the location-based service 255.

In some implementations, the process 400 can be performed when the user tries to dial an emergency phone number by selecting a display object associated with an emergency phone number (e.g., emergency dialing object 154) or by manually entering the numbers. For example, when the user selects the emergency dialing object 154 to initiate dialing of the associated emergency phone number, the device 100, before dialing the associated emergency phone number, can perform process 400 to update the associated emergency phone number and then dial the updated emergency phone number. As another example, if the user tries to dial a number that is well-known as an emergency phone number (e.g., "911," "112"), the device 100 can perform the process 400 to receive the emergency phone number for the current location and dial the received emergency phone number if the number originally dialed by the user is not the correct number for the determined geographic location.

In some implementations, if the user calls (e.g., by manual entering of digits, selection from an address book, selecting a dialing object, etc.) an emergency phone number or a phone number for consular services, for example, the device 100 can automatically invoke a map functionality and display a map showing the current location of the device (and presumably of the user) and nearby physical locations associated with the called emergency services or consular services. For example, if the user called a phone number for a consulate, the device 100 can display a map showing the current location of the device, the location of the consulate the user is calling, and optionally a route from the current location to the consulate. As another example, if the user called "911," the device 100 can display a map showing the current location of the device, locations of the nearest emergency services (e.g., police station, hospital, and/or fire department), and optionally a route to the emergency services. If the user called an emergency number associated with a specific emergency service (e.g., medical services), the device 100 can display a map with the current device location, the nearest location for the specific emergency service (e.g., nearest hospital), and optionally a route to the specific emergency service. In some implementations, the device 100 can further transmit the current location of the device to, for example, the called emergency service. Further, in some implementations, the device 100 displays on the display 102 the address for the current position of the device 100. The user, while on a call, can read out the displayed address to another party on the call. The address can also be emailed or sent in a text message to a contact.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method comprising:
    receiving, from a mobile device and by a server that includes one or more computers, a request for accessing one or more emergency services;
    determining, by the server, a current geographic location of the mobile device;
    identifying, by the server, an emergency number associated with an emergency service available at the geographic location;
    identifying emergency contact information, the emergency contact information specifying an in-case-of-emergency (ICE) contact designated by a user of the mobile device;
    initiating communication between the mobile device and the emergency service using the identified emergency number; and
    communicating with the ICE contact using the emergency contact information, wherein communicating with the ICE contact includes sending, from the server, at least one of a voice message or a text message to the ICE contact, wherein at least a portion of the text message was composed by the user prior to receiving the request by the server.

2. The method of claim 1, wherein the emergency contact information comprises at least one of an email address, an identifier of a text message service, or a telephone number.

3. The method of claim 2, wherein communicating with the ICE contact includes sending at least one of an email message or a short message service (SMS) text message to the ICE contact.

4. The method of claim 1, wherein the emergency number comprises a unified emergency phone number for a plurality of emergency services.

5. The method of claim 1, wherein determining a current geographic location of the mobile device comprises receiving the current geographic location from the mobile device.

6. A system, comprising:
    one or more processors; and
    a computer-readable medium storing instructions for execution by the one or more processors, the instructions operable to cause the one or more processors to perform operations comprising:
        receiving, from a mobile device, a request for accessing one or more emergency services;
        determining a current geographic location of the mobile device;
        identifying an emergency number associated with an emergency service available at the geographic location;
        identifying emergency contact information, the emergency contact information specifying an in-case-of-emergency (ICE) contact designated by a user of the mobile device;
        initiating communication between the mobile device and the emergency service using the identified emergency number; and
        communicating with the ICE contact using the emergency contact information, wherein communicating with the ICE contact includes sending at least one of a voice message or a text message to the ICE contact, wherein at least a portion of the text message was composed by the user prior to receiving the request by the server.

7. The system of claim 6, wherein
    the emergency contact information comprises at least one of an email address, an identifier of a text message service, or a telephone number, and
    wherein communicating with the ICE contact includes sending at least one of an email message or a short message service (SMS) text message to the ICE contact.

8. The system of claim 6, wherein the emergency number comprises a unified emergency phone number for a plurality of emergency services.

9. A non-transitory computer-readable medium storing instructions operable to cause a server to perform operations comprising:
    receiving, from a mobile device and by a server that includes one or more computers, a request for accessing one or more emergency services;
    determining, by the server, a current geographic location of the mobile device;
    identifying, by the server, an emergency number associated with an emergency service available at the geographic location;

identifying emergency contact information, the emergency contact information specifying an in-case-of-emergency (ICE) contact designated by a user of the mobile device;

initiating communication between the mobile device and the emergency service using the identified emergency number; and communicating with the ICE contact using the emergency contact information, wherein communicating with the ICE contact includes sending, from the server, at least one of a voice message or a text message to the ICE contact, wherein at least a portion of the text message was composed by the user prior to receiving the request by the server.

10. The non-transitory computer-readable medium of claim 9, wherein:

the emergency contact information comprises at least one of an email address, an identifier of a text message service, or a telephone number, and wherein communicating with the ICE contact includes sending at least one of an email message or a short message service (SMS) text message to the ICE contact.

11. The non-transitory computer-readable medium of claim 9, wherein determining a current geographic location of the mobile device comprises receiving the current geographic location from the mobile device.

12. The non-transitory computer-readable medium of claim 9, wherein the emergency number comprises a unified emergency phone number for a plurality of emergency services.

13. A method comprising:

receiving, by a mobile device, a request for accessing an emergency service;

determining a location of the mobile device;

accessing emergency information based on the location, the emergency information comprising default emergency information and override emergency information, the default emergency information including a first emergency number associated with a region that includes a venue, the override emergency information including a second emergency number being associated with the venue;

selecting a location-specific emergency number based on the location of the mobile device, including:
determining whether the location of the mobile device is at the venue;
selecting the first emergency number when the location of the mobile device is not at the venue, and
selecting the second emergency number when the location of the mobile device is at the venue; and initiating communication between the mobile device and the emergency service using the location-specific emergency number in response to the request.

14. The method of claim 13, wherein the region is a country, and the venue is a campus or complex of a university, company, or government entity.

15. The method of claim 13, comprising downloading, by the mobile device and from a server, the emergency information during a scheduled emergency information update.

16. The method of claim 13, wherein the emergency information includes default emergency information and override emergency information for multiple countries.

17. The method of claim 16, comprising:

providing for display a portion of the emergency information associated with a country that includes the venue, and hiding from display a portion of the emergency information associated with another country.

18. A system comprising:
one or more processors; and
a computer-readable medium storing instructions for execution by the one or more processors, the instructions operable to cause the one or more processors to perform operations comprising:
receiving, by a mobile device, a request for accessing an emergency service;
determining a location of the mobile device;
accessing emergency information based on the location, the emergency information comprising default emergency information and override emergency information, the default emergency information including a first emergency number associated with a region that includes a venue, the override emergency information including a second emergency number being associated with the venue;
selecting a location-specific emergency number based on the location of the mobile device, including:
determining whether the location of the mobile device is at the venue;
selecting the first emergency number when the location of the mobile device is not at the venue, and
selecting the second emergency number when the location of the mobile device is at the venue; and
initiating communication between the mobile device and the emergency service using the location-specific emergency number in response to the request.

19. A non-transitory computer-readable medium storing instructions operable to cause a computing device to perform operations comprising:

receiving, through a user interface of a mobile device, a request for accessing an emergency service;

determining a location of the mobile device;

accessing emergency information based on the location, the emergency information comprising default emergency information and override emergency information, the default emergency information including a first emergency number associated with a region that includes a venue, the override emergency information including a second emergency number being associated with the venue;

selecting a location-specific emergency number based on the location of the mobile device, including:
determining whether the location of the mobile device is at the venue;
selecting the first emergency number when the location of the mobile device is not at the venue, and
selecting the second emergency number when the location of the mobile device is at the venue; and initiating communication between the mobile device and the emergency service using the selected location-specific emergency number in response to the request.

20. The non-transitory computer-readable medium of claim 19, wherein the emergency information includes default emergency information and override emergency information for multiple countries.

21. The non-transitory computer-readable medium of claim 19, the operations comprising:

providing for display a portion of the emergency information associated with a country that includes the venue, and hiding from display a portion of the emergency information associated with another country.

* * * * *